Nov. 23, 1965  H. M. HUFFMAN ETAL  3,218,806
MASTER CYLINDER RESERVOIR CONNECTION
Filed Sept. 23, 1964
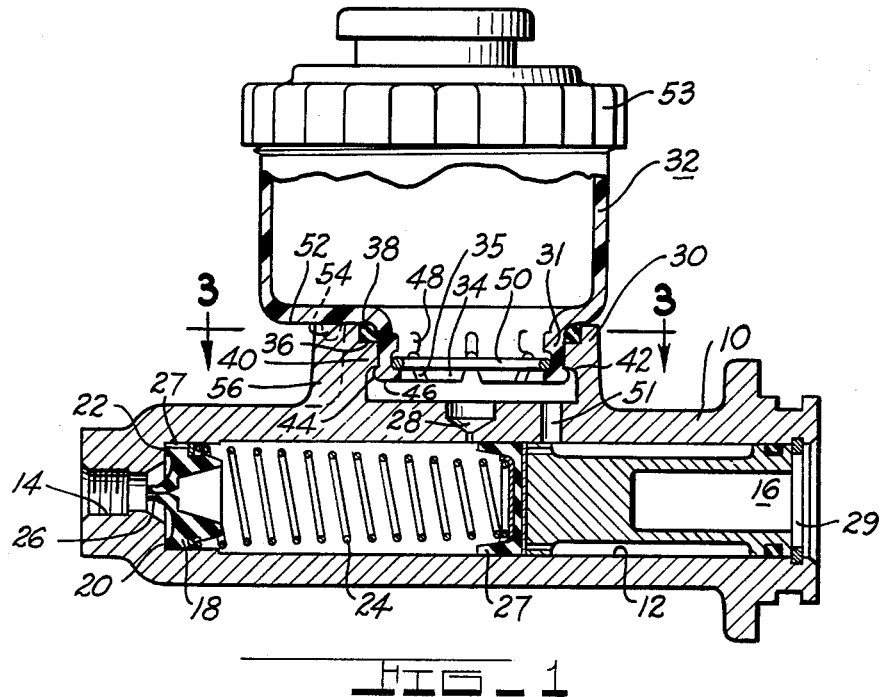
FIG_1
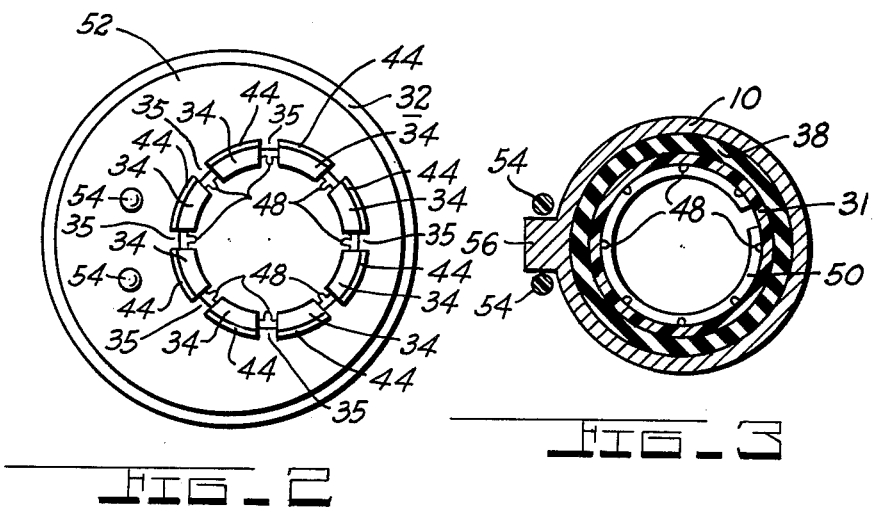
FIG_2  FIG_3
INVENTOR.
HERMAN M. HUFFMAN.
LESTER J. LARSEN.
BY
Sheldon F. Raizes
ATTORNEY.

United States Patent Office 3,218,806
Patented Nov. 23, 1965

3,218,806
MASTER CYLINDER RESERVOIR CONNECTION
Herman M. Huffman, Kalamazoo, and Lester J. Larsen, St. Joseph, Mich., assignors to The Bendix Corporation, St. Joseph, Mich., a corporation of Delaware
Filed Sept. 23, 1964, Ser. No. 398,517
6 Claims. (Cl. 60—54.6)

This invention relates to a connection between a master cylinder casting and its reservoir.

An object of this invention is to provide a master cylinder, reservoir connection which is an improvement over that disclosed in copending U.S. application Serial No. 398,516, also assigned to The Bendix Corporation.

Another object of this invention is to provide a master cylinder with a reservoir which is of different material than the master cylinder, wherein the connection of the reservoir to the master cylinder is simple, easy to assemble, and yet fluid tight throughout varying temperatures.

Other objects of the invention will become apparent from the following description with reference to the drawings wherein:

FIGURE 1 is a sectional view of a master cylinder and a reservoir assembly;

FIGURE 2 is a bottom view of the reservoir; and

FIGURE 3 is a view taken along section line 2—2 of FIGURE 1.

Referring to FIGURE 1, there is illustrated a master cylinder casting 10 comprising a bore 12 having a fluid outlet port 14 at one end thereof and a slidable actuating piston 16 therein at the other end thereof. A residual pressure valve 18 is also located in the bore and has an annular surface 20 biased against an annular seat 22 by a spring 24 and permits fluid displaced by the piston 16 to flow between a split lip 26 during actuation of the master cylinder and upon the return stroke of the piston 16 is unseated against the force of the spring 24 to permit return fluid to pass through openings 27 in the outer peripheral edge of the valve member 18. A lip seal 27 is provided on the advanced end of the piston 16 for closing off a compensating port 28 during actuation of the master cylinder. The spring 24 is compressed between the seal and the valve member 18 to hold the seal in engagement with the piston and to return the piston to its normal position against a stationary snap ring 29, in addition to seating the valve member 18.

A female annular flange 30 is integral with the casting 10 and receives therein an annular male flange 31 of a fluid reservoir 32. The reservoir may be of any suitable material although plastic is preferred and illustrated. The male flange 31 comprises a plurality of flexible fingers 34 separated by slots 35 opening onto the lower edge thereof. The upper inner surface of the flange 30 has an annular shoulder 36 for receiving an O-ring 38 thereon and also has an annular rib 40 having a tapered undersurface 42. Each finger 34 has a tapered lip 44 projecting from the lower outer surface thereof, which in its unflexed state is of a greater outer diameter than the inner diameter of the annular rib 40. When the male flange 31 is inserted into the female flange 30, the fingers are compressed towards one another, due to engagement of the tapered part of the lips 44 with the rib 40, and then expand when the lips 44 pass the rib to engage the tapered undersurface 42 of the rib 40 thereby securing the reservoir the casting 10. A lip 46 also projects from the lower inner surface of each finger 34 and a nib 48 projects inwardly from the closed end of each slot 35. A snap ring 50 is located between the inner lip 46 and the nibs 48 and applies an expanding force on the fingers to expand the same into engagement with the annular rib 40 to provide an additional force for securing the reservoir to the casting. The nibs 48 maintain the snap ring 50 in the correct location and also facilitate assemblying the snap ring since the person assemblying the same will know that once the snap ring is beyond the nibs it is properly seated. The undersurface 52 of the reservoir seats on the top edge of the flange 30 and the distance between the undersurface 52 and the lips 44 is such that the O-ring 38 is compressed upon assembly to prevent leakage of fluid therepast. The compensating port 28 and a replenishing port 51 communicate the reservoir to the bore 12.

The force exerted on the fingers by the snap ring is not large enough to prevent rotation of the reservoir relative to the casting when, for instance, a rotational effort is required to loosen or tighten a reservoir cap 53. In order to prevent rotation of the reservoir, the reservoir is provided with a pair of spaced beads 54 projecting from the undersurface 52 thereof and straddling a narrow ridge 56 on the casting 10. This anti-rotational feature forms the subject matter of copending U.S. application Serial Number 398,518, which is also assigned to The Bendix Corporation.

The connection between the casting and the reservoir is not affected by changes in temperature. The plastic reservoir will expand or contract more than the casting due to changes in temperature. During an increase in temperature, the fingers 34 will remain in contact with the rib 40 and during contraction caused by a decrease in temperature, the snap ring 50 is strong enough to maintain the fingers 34 in contact with the rib 40.

Constructing the flange 31 with a plurality of fingers 34 enables a snap-on type connection between the reservoir and the casting and also makes it possible for the snap ring 40 to maintain contact between the fingers 34 and the rib 40 during severe cold weather. If the flange were solid instead of slotted, the flange would not be flexible enough to provide a snap-on connection and the snap ring force would be overcome by the flange during contraction resulting in the male flange 31 pulling away from the rim 40 and/or the snap ring digging into the flange 31 producing ultimate failure of the connection.

While the invention has been described in considerable detail, we do not wish to be limited to the particular construction shown and described and it is our intention to cover hereby all equivalent constructions which come within the scope of the following claims.

We claim:

1. A master cylinder, reservoir assembly comprising: a body member and a hollow reservoir member, said body member having a fluid actuating chamber therein, an opening in said body member, said hollow reservoir member having a flexible annular flange at the lowermost end thereof, said flange having a plurality of slots intersecting the free end thereof defining therebetween a plurality of flexible flange sections, an annular shoulder located in said opening facing away from said reservoir and located between the ends of the wall of said opening, an annular rib extending outwards from the outer surface of said annular flange and located at the lowermost end thereof, said flange extending into said opening with said rib engaging said shoulder, means engaging the inner surface of said flange sections pressing the outer surface of said flange sections against said wall, passage means communicating the interior of said reservoir member with said fluid actuating chamber.

2. The structure as recited in claim 1, wherein the interior surface of each flange section is provided with a ledge at the lowermost end thereof, and an inwardly extending nib is located at the closed end of each slot, said resilient member is a resilient split ring located between said nibs and said ledges for urging said flange sections into engagement with the wall of said opening.

3. The structure as recited in claim 2 wherein said wall of said opening is an annular flange projecting from said body member.

4. A master cylinder, reservoir assembly comprising: a body member and a hollow reservoir member, said body member having a fluid actuating chamber therein, an opening in said body member, said hollow reservoir member comprising an annular wall terminating in an annular base portion located at one end of said annular wall and transverse thereto and a flexible annular flange extending away from said annular base portion, said flange having a plurality of slots intersecting the free end thereof defining therebetween a plurality of flexible flange sections, an annular recess at the outermost portion of the wall of said opening, an annular sealing member disposed in said recess, an annular shoulder located in said opening facing away from said reservoir and located between the ends of said wall of said opening, an annular rib extending outwards from the outer surface of said annular flange and located at the lowermost end thereof, said flange extending into said opening with said rib engaging said shoulder, said annular base portion of said reservoir engaging the upper end of the wall of said opening, said annular sealing member engaging said annular base portion and the outer surface of said flange, a resilient member engaging the inner surface of said flange sections pressing the outer surface of said flange sections against said wall, passage means communicating the interior of said reservoir member with said fluid actuating chamber.

5. The structure as recited in claim 4 wherein the interior surface of each flange section is provided with a ledge at the lowermost end thereof and an inwardly extending nib is located at the closed end of each slot, said resilient member is a resilient split ring located between said nibs and said ledges for urging said flange sections into engagement with the wall of said opening.

6. The structure as recited in claim 5 wherein said wall of said opening is an annular flange projecting from said body member.

No references cited.

JULIUS E. WEST, *Primary Examiner.*